(12) United States Patent
Swanson

(10) Patent No.: US 12,310,345 B2
(45) Date of Patent: *May 27, 2025

(54) FISHING LURE PRODUCING ELECTROMAGNETIC FIELDS

(71) Applicant: Timothy J. Swanson, Cologne, MN (US)

(72) Inventor: Timothy J. Swanson, Cologne, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,434

(22) Filed: Dec. 15, 2021

(65) Prior Publication Data

US 2022/0174924 A1 Jun. 9, 2022

Related U.S. Application Data

(63) Continuation of application No. 16/666,012, filed on Oct. 28, 2019, now Pat. No. 11,229,192.

(51) Int. Cl.
| | | |
|---|---|---|
| *A01K 85/01* | (2006.01) | |
| *A01K 85/10* | (2006.01) | |
| *A01K 85/12* | (2006.01) | |
| *H01F 7/02* | (2006.01) | |
| *H01F 7/20* | (2006.01) | |

(52) U.S. Cl.
CPC .............. *A01K 85/01* (2013.01); *A01K 85/10* (2013.01); *A01K 85/12* (2013.01); *H01F 7/02* (2013.01); *H01F 7/20* (2013.01)

(58) Field of Classification Search
CPC ..................................................... A01K 85/01
See application file for complete search history.

(56) References Cited

U.S. PATENT DOCUMENTS

| | | | |
|---|---|---|---|
| 4,970,808 A | 11/1990 | Massie | |
| 5,175,950 A * | 1/1993 | Linder | A01K 85/01 43/17.1 |
| 6,012,248 A * | 1/2000 | Kechriotis | A01K 85/16 43/42.53 |
| 6,108,962 A | 8/2000 | Barron | |
| 6,301,822 B1 | 10/2001 | Zernov | |
| 6,564,497 B2 | 5/2003 | Jackson, II | |
| 7,240,453 B1 * | 7/2007 | Safwat | A01K 79/02 43/17.1 |
| 2009/0013583 A1 | 1/2009 | Leung et al. | |

(Continued)

FOREIGN PATENT DOCUMENTS

| | | | | |
|---|---|---|---|---|
| DE | 102018117801 B3 * | 8/2019 | ............. | A01K 85/01 |
| KR | 102344117 B1 * | 4/2019 | | |

(Continued)

*Primary Examiner* — Christopher P Ellis
(74) *Attorney, Agent, or Firm* — Brooks, Cameron & Huebsch, PLLC

(57) ABSTRACT

Fishing lures are disclosed herein. One fishing lure, includes a body having a front portion and a back portion wherein the front and back portion are constructed and arranged such that at least one of the portions can move with respect to the other portion and an electromagnetic field generation system having a magnet and a coil of conductive wire wherein the wire has a contact at each end of the coil and wherein the magnet and the coil are separated from each other such that the magnet is located in either the front portion or back portion and the coil is located in the portion not containing the magnet.

12 Claims, 6 Drawing Sheets

(56) References Cited

U.S. PATENT DOCUMENTS

| | | | |
|---|---|---|---|
| 2010/0251595 A1* | 10/2010 | Leung | A01K 85/01 43/2 |
| 2011/0061287 A1 | 3/2011 | Ogawa | |
| 2013/0042517 A1 | 2/2013 | Danielson | |
| 2016/0000057 A1 | 1/2016 | Mistilis | |
| 2016/0007581 A1* | 1/2016 | Davidson | A01K 85/01 359/809 |
| 2016/0235046 A1 | 8/2016 | Eitenne-Cummings et al. | |
| 2019/0313616 A1* | 10/2019 | Aguilar | A01K 85/01 |
| 2019/0364864 A1* | 12/2019 | Jacobson | A01K 85/12 |
| 2019/0380321 A1* | 12/2019 | Heines | A01K 85/16 |
| 2021/0076650 A1* | 3/2021 | Bingham | A01K 85/18 |

FOREIGN PATENT DOCUMENTS

| | | | |
|---|---|---|---|
| WO | 97/08948 | 3/1997 | |
| WO | WO-9708948 A1 * | 3/1997 | A01K 85/01 |
| WO | WO-9734469 A1 * | 9/1997 | A01K 85/00 |
| WO | WO-9921416 A1 * | 5/1999 | A01K 85/01 |

* cited by examiner

FISHING LURE PRODUCING ELECTROMAGNETIC FIELDS

PRIORITY INFORMATION

This application is a continuation of application Ser. No. 16/666,012 filed Oct. 28, 2019, now U.S. Pat. No. 11,229,192 issued Jan. 25, 2022, the specification of which is incorporated herein by reference.

TECHNICAL FIELD

The present disclosure relates to fishing lures.

BACKGROUND

Electromagnetic fields are present in many objects found in nature. For example, aquatic animals exhibit a type of electromagnetic field that provides DC field potentials. In fish, the strongest part of this field is commonly produced in the head and gill region. Ranges of these fields can be extremely low, for example in the microvolt (µV) potential. When injured, the electromagnetic field strength in the fish increases making the fish easier to distinguish from other natural elements emitting electromagnetic fields.

Some predators have physiological features to detect such electromagnetic fields and can use them to detect, track, and target its prey. For example, in order to detect low frequency electromagnetic fields, some fish have specialized receptors to detect and interpret the incoming electromagnetic information. One such system is the ampullary electrosensory system of fish. The systems in such animals are similar to modified hair cell sensors. The ampullary receptor system on such fish includes a number of pores on the skin of the animal and having an electromagnetic field sensing structure therein.

An example of such a system is known in the distribution of Ampullae of Lorenzini along the nose of sharks and other animals for prey detection, among other functions. In sharks, the Ampullae of Lorenzini is the ampullary organ used to detect electrical stimuli. These receptors are distributed along the dorsal and ventral head region of the sharks. Similar physiological receptors have also been found to be present on freshwater fish, such as bass, northern pike, and muskies, among others.

DETAILED DESCRIPTION

Figure 1:
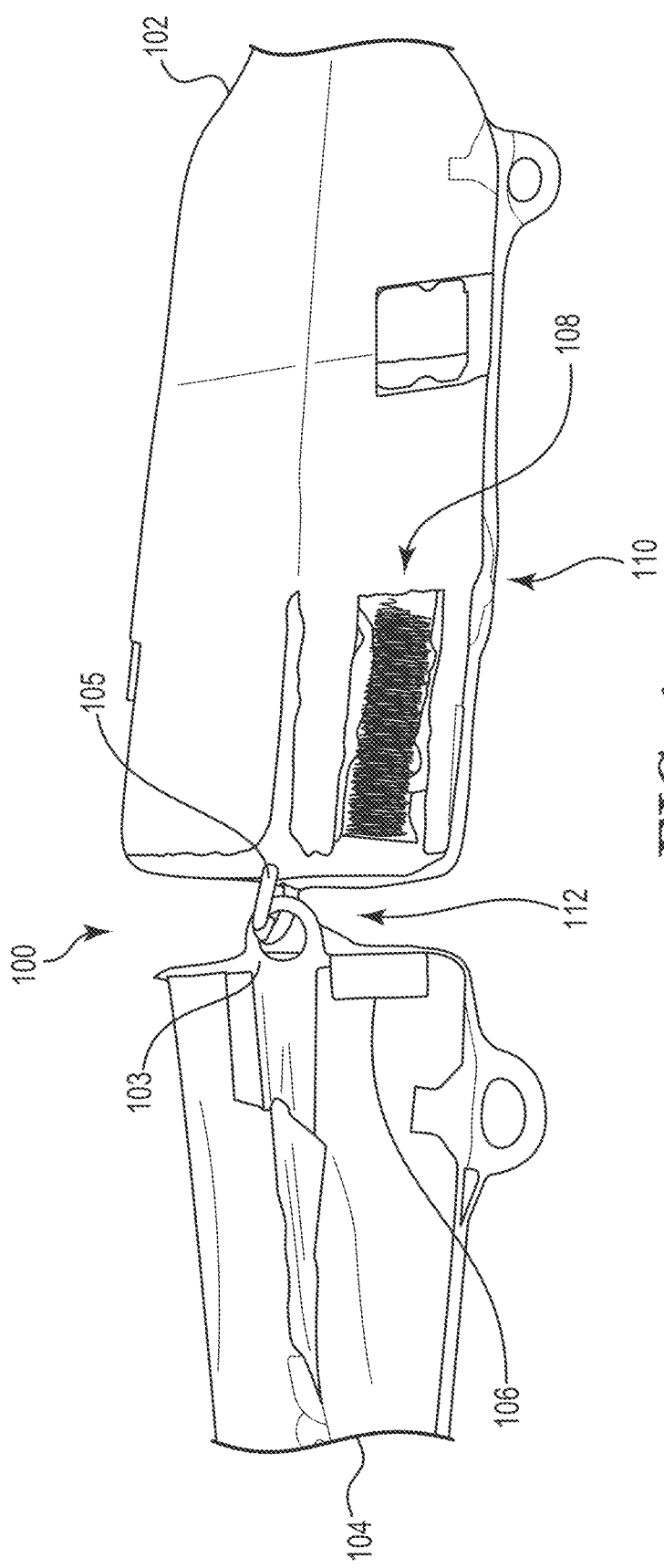
FIG. 1 illustrates a cut away side view of a lure according to the embodiments of the present disclosure.

The present disclosure includes a number of fishing lure embodiments each having electromagnetic field generation mechanisms. For example, in one embodiment, a fishing lure can include a body having a front portion and a back portion wherein the front and back portions are constructed and arranged such that at least one of the portions can move with respect to the other portion.

The example embodiment further including an electromagnetic field generation system having a magnet and a coil of conductive wire wherein the wire has a contact at each end of the coil and wherein the magnet and the coil are separated from each other such that the magnet is located in either the front portion or back portion and the coil is located in the portion not containing the magnet. Several different lure concepts are shown in the accompanying drawings and described herein.

In the following portion of the detailed description, reference is made to the accompanying figures that form a part hereof. The figures show by way of illustration how one or more embodiments of the disclosure may be practiced.

Further, the figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2A.

Also, as used herein, "a", "at least one", or "a number of" something can refer to one or more such things. For example, "a number of elements" can refer to one or more elements.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Further, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

FIG. 1 illustrates a cut away side view of a lure according to the embodiments of the present disclosure. In the embodiment of FIG. 1, the lure 100 includes a body having a front portion 102 and a back portion 104.

The front and back portion are constructed and arranged to utilize a movement mechanism 112 such that at least one of the portions can move with respect to the other portion. In this embodiment, the mechanism 112 used to provide such movement is a pair of eyes (103 and 105), with one eye 105 fixed to an end surface of the front portion 102 and the second eye 103 fixed to an end of the back portion 104.

The eyes (103 and 105) are formed to create a loop (out of metal, in the provided example, although other materials may be used) with an aperture formed by the curvature of the loop. In order to connect the eyes, the loop of one eye is placed through the aperture of the other eye. This arrangement allows one portion of the body (e.g., back portion 104) to move with respect to the other portion of the body (e.g., front portion 102).

This arrangement also creates a space between the front and back portions of the lure. This allows the back portion to have some space to move with respect to the front portion.

The movement can be accomplished, for example, by manipulation of the lure through the water by an angler that has the lure attached to a fishing rod via fishing line or via a mechanism (e.g., spinner, fin, shape of body portions), such as those described herein. Although several mechanisms are discussed herein, other suitable mechanisms may be utilized in embodiments as claimed herein to move a magnet on one portion of the lure's body near a coil on another portion of the lure's body.

As discussed above, the embodiment of FIG. 1 also includes an electromagnetic field generation system having one or more magnets (in this example, one magnet 106 is used) and a coil of conductive wire 108 having a contact 110 at each end of the coil. Although the coil in FIG. 1 has two contacts, only one contact is visible in this figure, as a portion of the lure has been cut away to show the interior elements of the lure. An example showing both contacts is provided in FIG. 2B.

The magnet and the coil are separated from each other such that the magnet is located in either the front portion or back portion (in FIG. 1, the magnet 106 is in the back portion 104) and the coil is located in the portion not containing the magnet (accordingly, in FIG. 1, the coil 108 is in front portion 102). With this arrangement, the magnet generates an electromagnetic field which interacts with the coil to generate a current in the coil.

This current fluctuates as the one or more magnets move with respect to the coil. The contacts are exposed to the water and when the lure is in use, the water completes a circuit with the contacts and the coil and, thereby, a variable electromagnetic field is created that is identifiable to predators having electroreceptors. Further, the variable electromagnetic field may be more lifelike than a static electromagnetic field and, therefore, may attract more or more desirable fish. Several other embodiments of lure types according to the present disclosure are discussed in detail below.

Figure 2A:
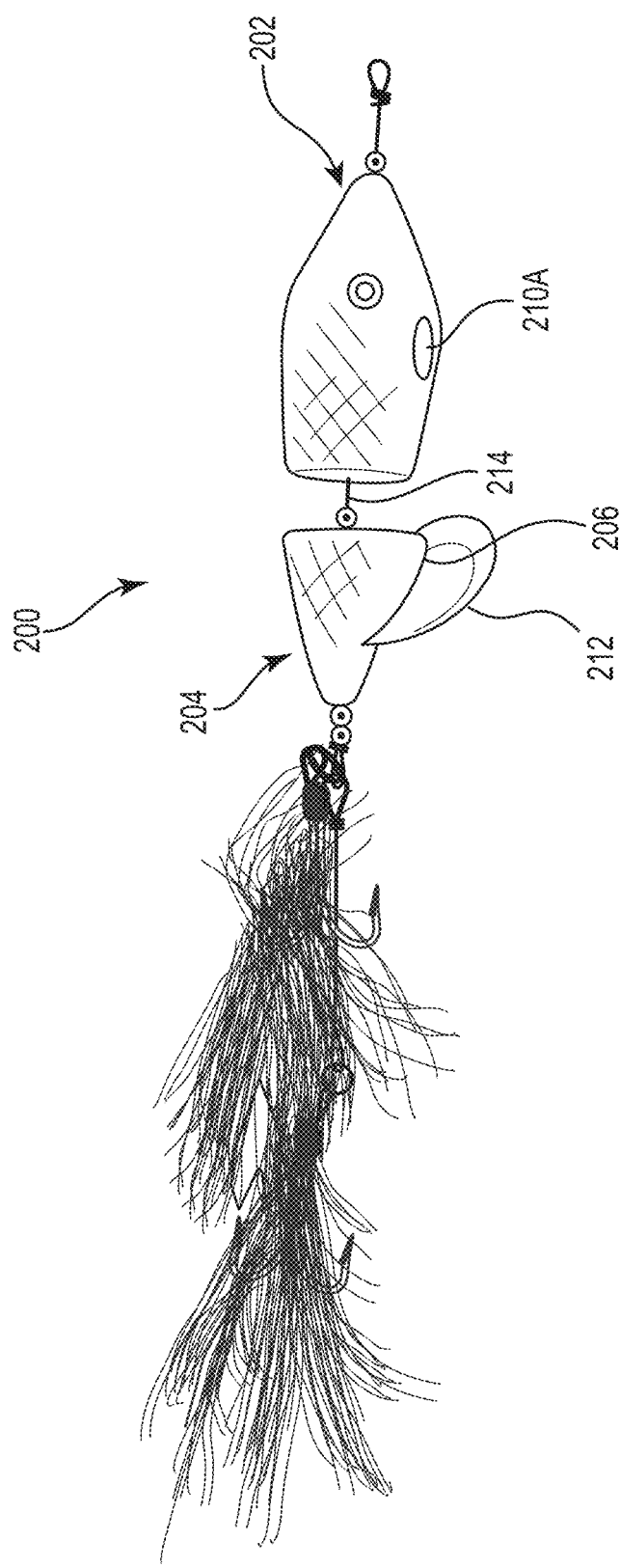
FIG. 2A illustrates a side view of another lure according to the embodiments of the present disclosure.

FIG. 2A illustrates a side view of another lure according to the embodiments of the present disclosure. As in the example of FIG. 1, the embodiment of FIG. 2A provides a lure 200 that includes a body having a front portion 202 and a back portion 204. The front portion 202 includes a coil within the body of the lure.

As shown in FIG. 2A, as used herein, the term coil means a length of wire that has been bent to form one or more loops. The coil has a pair of contacts (only one shown in this view at 210), one on each end of the length of wire used to form the coil. The coil interacts with a magnet 206 provided on the back portion 204 of the lure.

In this embodiment, the lure has a different mechanism to provide the movement between the coil and the magnet. In this embodiment, the front and back portions 202 and 204 are connected together by a shaft 214 with the connection between the two being in a manner such that the back portion 204 can rotate with respect to the front portion 202 around the elongate axis of the shaft 214. In such an embodiment, and as shown in FIG. 1, the magnet and the coil can be located near the outer edge of their respective body portions. In an embodiment such as that shown in FIGS. 2A-2C, since the shaft is at the center of the body portions and the magnet and coil are near the edge of the body portions, as the magnet rotates with respect to the coil, the further toward the edge the magnet and coil are, the more significant the change in the electromagnetic field as one rotates with respect to the other.

The rotation of the back portion can be aided based on the shape of the back portion. For example, the back portion could have features designed in its surface that, when moved through the water, can cause the back portion to rotate.

The back portion can also include additional features that aid this rotation. For example, the back portion 204 of FIG. 2A includes a fin 212 that, when it interacts with the water, encourages the back portion 204 to rotate.

As can be seen from the embodiment of FIG. 2A, in some implementations, the lure can have more than just a front portion and a back portion. In the example of FIG. 2A, the lure has two sets of hooks and feathers attached behind the back portion. In some embodiments, the body may have three or more portions with a front and back portion as described above being two of them.

Further, in some embodiments, the body may have more than one coil and/or more than one magnet. In such embodiments, the multiple coils and/or magnets may be separate systems, for example, each including one or more magnets and one or more coils or may be a more complex system wherein the system has multiple magnets moving with respect to one or multiple coils or one or more magnets moving with respect to multiple coils.

Figure 2B:
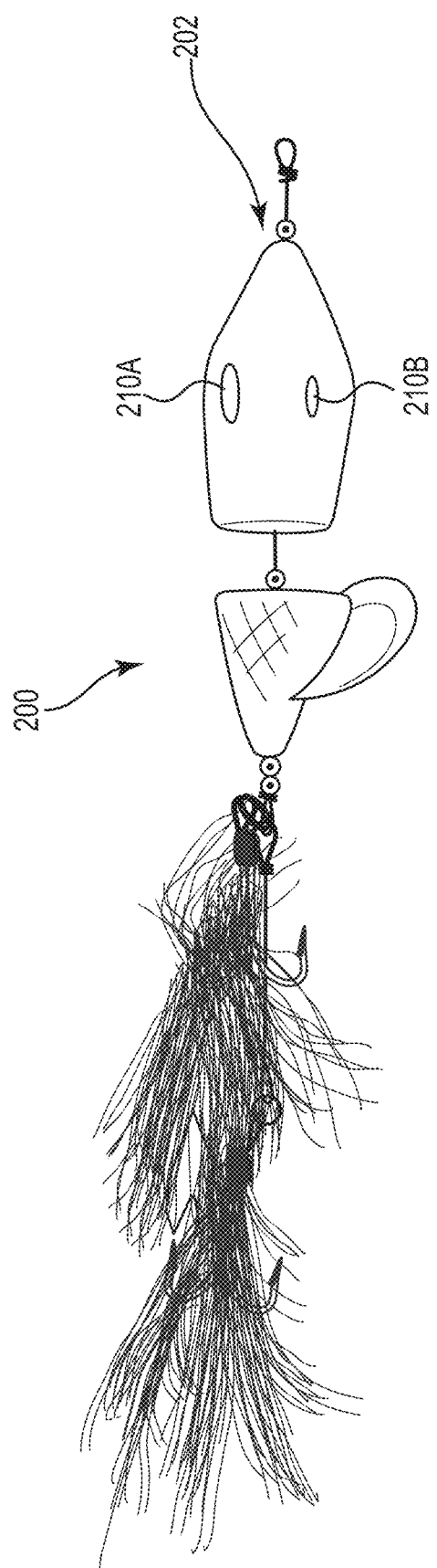
FIG. 2B illustrates a bottom view of the lure of FIG. 2A.

FIG. 2B illustrates a bottom view of the lure of FIG. 2A. In this figure, the head of the lure 200 (i.e., front portion 202) has been rotated so that both contacts 210A and 210B can be viewed.

As shown, the lure can be painted in an attractive pattern or to replicate a bait fish and/or can be epoxy coated to protect the lure. In such embodiments, the contacts can be positioned such that the paint or epoxy does not cover the contacts. Alternatively, the paint and/or epoxy can be removed from the contacts after it has been applied.

Figure 2C:
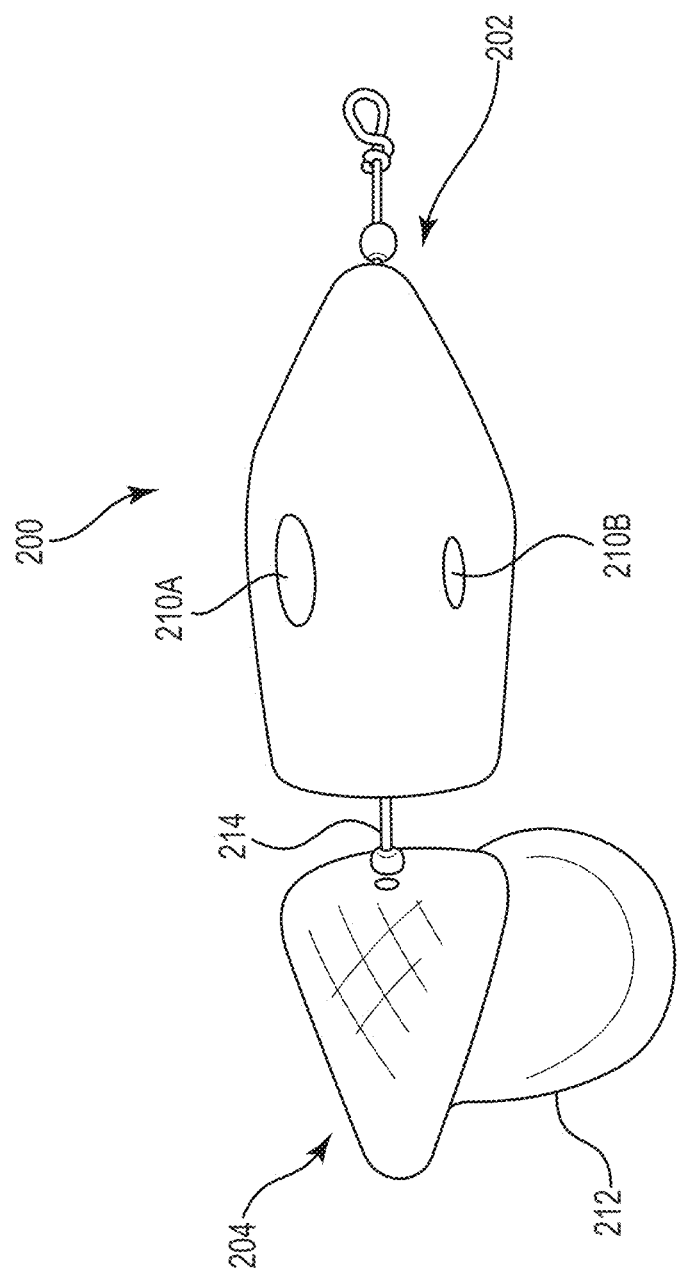
FIG. 2C illustrates an enlarged bottom view of the front portion of the lure of FIG. 2A.

FIG. 2C illustrates an enlarged bottom view of the front portion of the lure of FIG. 2A. In this view, it can be seen that the paint and epoxy on the front portion 202 of lure 200 has been removed from the contacts 210A and 210B.

This view also shows that a spacing bead has been positioned on shaft 214 between the front portion 202 and 204. This bead is provided to maintain a space between the front portion 202 and back portion 204 to allow for the back portion 204 to freely rotate about the shaft 214, among other benefits.

FIG. 2C also provides a better view of the fin 212. As can be seen from this view, in some implementations, the fin 212 can have a curvature or other shape to more effectively transfer the fin's interaction with the water into rotational movement of the back portion 204 with respect to the front portion 202 and, thereby, movement of the magnet with respect to the coil.

Figure 3:
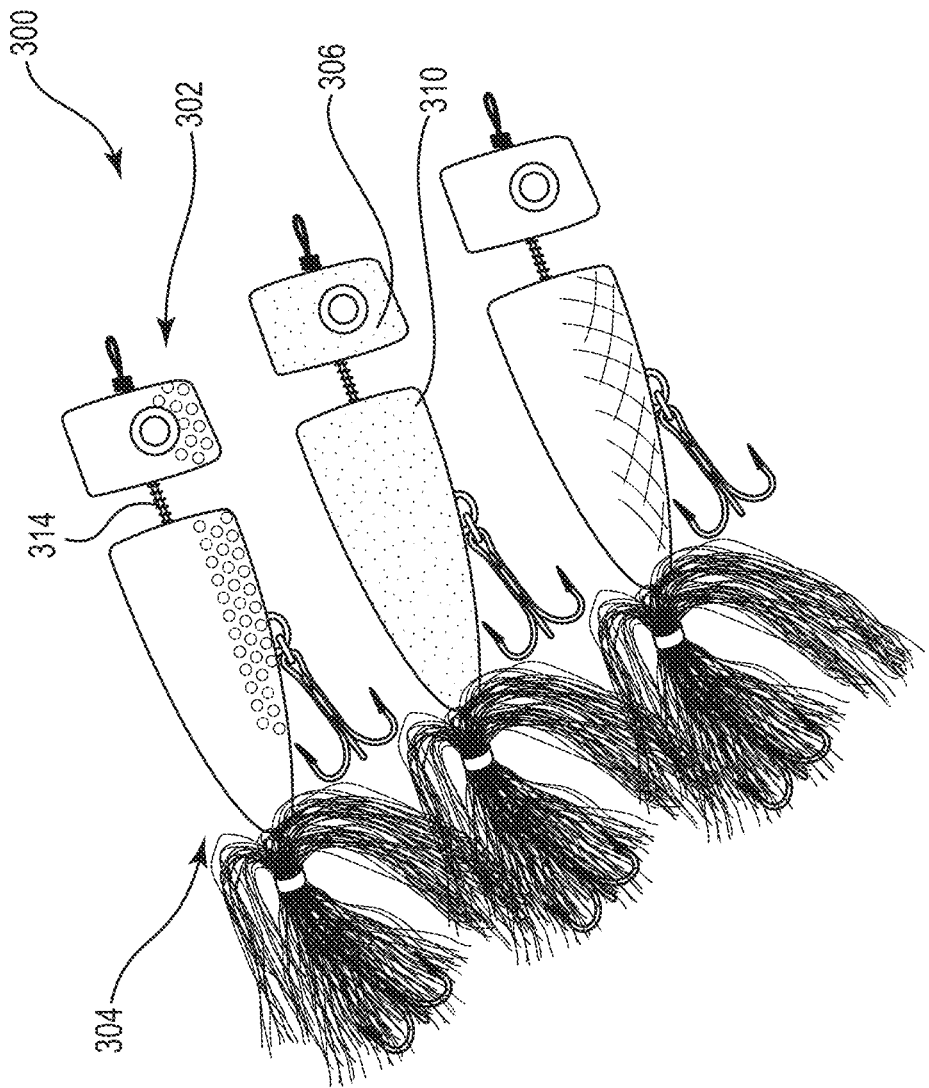
FIG. 3 illustrates an example of a different style of lure illustrating other embodiments of the present disclosure.

FIG. 3 illustrates an example of a different style of lure illustrating other embodiments of the present disclosure. In this embodiment, the lures 300 have a front portion 302 and a back portion 304 that are connected by a shaft 314. However, in this embodiment, the front portion 302 is mounted slidably on the shaft such that it can get closer and farther from the back portion 304, thereby changing its respective position with respect to the back portion 304.

In this embodiment, the front portion 302 includes the magnet 306 and the back portion 304 includes the coil and contacts 310. The magnet's movement closer and farther from the coil will vary the magnetic field as the lure moves through the water.

The portion of the elongate shaft 314 between the front portion and back portion of the body (the shaft is actually longer and extends into both portions in the embodiments shown in FIG. 3) is positioned in an elongate spring (in the embodiment of FIG. 3, they are generally coaxial). The spring allows the front portion to return to its initial position such that the magnet can oscillate from being a longer distance from the coil to a shorter distance and back again. Such a movement can be produced by pulling the lure quickly through the water, which pushes the front portion 302 toward the back portion 304 and then slowing or stopping the pulling of the lure at which point the spring urges the front portion 302 to return to or near to its original position which is farther away from the back portion 304 than it was when being pulled.

Figure 4:
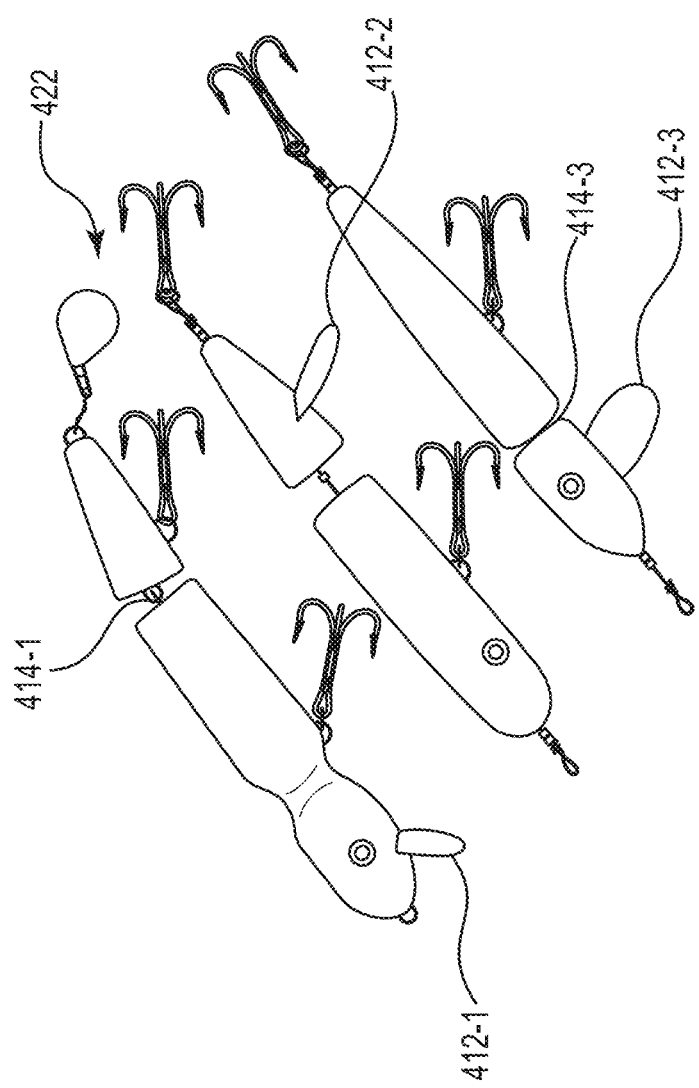
FIG. 4 illustrates an example of three different styles of lures illustrating other embodiments of the present disclosure.

FIG. 4 illustrates an example of three different styles of lures illustrating other embodiments of the present disclosure. The top lure provided in FIG. 4 has a similar mechanism 414-1 to connect the front portion and the back portion as is shown in the embodiment of FIG. 1 (two connected eyes). However, it adds two elements that encourage irregular movement of the lure through the water which will cause the coil to generate a more irregular electromagnetic field.

First, a fin 412-1 is placed on the front portion of the lure. The particular orientation of this fin shown in FIG. 4 can assist in causing the lure to dive deeper into the water or move the lure from side to side.

A second element is added to the back portion of the lure. Here, a spinner 422 is attached to the back of the back portion. Its interaction with the water and movement thereby causes the back portion of the lure to move irregularly and thereby generates an irregular electromagnetic field.

The middle lure shown in FIG. 4 has a mechanism similar to that of the embodiment of FIGS. 2A-2C. In this embodiment, the front and back portions are separated and connected by an elongate shaft. The back portion is attached such that it can rotate around the shaft. The lure includes a fin 412-2 that encourages the rotational movement by interaction with the water as the lure is pulled forward through the water.

The bottom lure shown in FIG. 4 has a similar mechanism connecting the front and back sections as those shown in FIGS. 2A-2C and the middle lure of FIG. 4, but the arrangement of the elements and the lure's movement are different. In this embodiment, the front and back portions are connected via a shaft 414-3.

However, in this embodiment, the front portion is rotatably mounted such that the front portion rotates around the shaft. The lure also includes a fin 412-3 that is provided on the front portion. This fin encourages the front portion to rotate with respect to the back portion and, thereby, provides the movement to vary the electromagnetic field as the coil and magnet can be mounted in a manner similar to FIGS. 2A-2C. As can be noted by the embodiment in the bottom figure, in such shaft mounted embodiments, the distance between the front and back portions can be small as opposed to the distance provided by the shaft in the middle lure.

All of the embodiments herein provide novel electromagnetic performance. Through use of such devices, anglers should see improved performance when fishing.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

The invention claimed is:

1. A fishing lure, comprising:
a body having a first portion and a second portion wherein at least one of the portions can move with respect to the other portion; and
a magnetic material and a coil of conductive material wherein the magnetic material is located in either the first portion or second portion and the coil is located in the portion not containing the magnetic material; and
wherein the first and second portions move with respect to each other such that the distance between the magnetic material and the coil of conductive material changes between being a longer distance and a shorter distance.

2. The fishing lure of claim 1, wherein the lure includes a first eye connected to the first portion and a second eye connected to the second portion and wherein the eyes are connected to each other such that one of the portions can move with respect to the other portion.

3. The fishing lure of claim 1, wherein the second portion includes a fin to interact with water around the lure when in use to move the second portion with respect to the first portion.

4. The fishing lure of claim 1, wherein the second portion includes a spinner to interact with water around the lure when in use to move the second portion with respect to the first portion.

5. The fishing lure of claim 1, wherein the first portion includes a fin to interact with water around the lure when in use to rotate the first portion with respect to the second portion.

6. The fishing lure of claim 1, wherein the lure includes a swivel connected between the first portion and the second portion and wherein the swivel allows one of the portions to spin with respect to the other portion.

7. The fishing lure of claim 6, wherein the swivel is constructed and arranged to maintain a space between the first and second portions.

8. The fishing lure of claim 7, wherein the second portion includes a fin to interact with water around the lure when in use to spin the second portion with respect to the first portion.

9. The fishing lure of claim 1, wherein the contacts are exposed to the water when the lure is in use.

10. The fishing lure of claim 1, wherein the lure includes a shaft connected between the first portion and the second portion with a spring on the shaft and wherein the shaft and spring allow one of the portions to move closer to and farther from the other portion.

11. A fishing lure, comprising:
a body having a first portion and a second portion wherein the first and second portion are constructed and arranged such that at least one of the portions can move with respect to the other portion; and an electromagnetic field generation system having a magnetic material and a coil of conductive material wherein the magnetic material is located in either the first portion or second portion and the coil is located in the portion not containing the magnetic material; and wherein the first and second portions move with respect to each other such that the distance between the magnetic material and the coil of conductive material changes between being a longer distance and a shorter distance.

12. A fishing lure, comprising:

a body having a first portion and a second portion wherein at least one of the portions can move with respect to the other portion; and a magnetic material and a coil of conductive material wherein the magnetic material and the coil are separated from each other such that the magnetic material is located in either the first portion or second portion and the coil is located in the portion not containing the magnetic material; and wherein the first and second portions move with respect to each other such that the distance between the magnetic material and the coil of conductive material changes between being a longer distance and a shorter distance.

* * * * *